Aug. 9, 1966 W. S. DRUZ ET AL 3,266,021

REMOTE CONTROL SYSTEM USING SEMICONDUCTOR SWITCHING DEVICES

Original Filed May 11, 1961

INVENTORS
Walter S. Druz
John Isabeau

BY Francis W. Crotty

ATTORNEY

United States Patent Office 3,266,021
Patented August 9, 1966

3,266,021

REMOTE CONTROL SYSTEM USING SEMICONDUCTOR SWITCHING DEVICES

Walter S. Druz, Hinsdale, Ill., and John Isabeau, Mountain View, Calif., assignors to Zenith Radio Corporation, Chicago, Ill., a corporation of Delaware Continuation of application Ser. No. 109,329, May 11, 1961. This application Mar. 10, 1965, Ser. No. 440,067
8 Claims. (Cl. 340—171)

This is a continuation of the copending application of Walter S. Druz et al., Serial No. 109,329, filed May 11, 1961, now abandoned, and assigned to the same assignee.

This invention relates in general to remote control systems and, more specifically, to a system for performing control functions in a device by means of remotely generated super audible command signals. There are broad areas of use for this invention but for convenience it will be described in conjunction with a television broadcast receiver.

Remote control devices, as such, have long been proposed for controlling the operation of wave signal receivers but for a variety of reasons they were found unacceptable by the public until the introduction of the super audible system shown in United States Patent No. 2,817,025 issued to Robert Adler and assigned to the assignee of this application. The arrangement of that patent comprises an entirely mechanical, hand-held and hand actuated transmitter which directs command signals to a companion receiver operatively connected to a television set to accomplish the control of certain functions in that set as determined by the particular frequency of the received command signal. The present invention represents a further development of that system.

More particularly, the receiver illustrated in the Adler patent includes a detector and integrating system which develops the control potential necessary to actuate a relay if a received command signal endures beyond a predetermined period of time and meets a certain duty cycle requirement as explained in the patent. This part of the receiver contributes materially to the noise immunity of the control system so that spurious signals encountered in the environment of the television set, even though they may correspond in frequency to the command signals emitted by the hand-held transmitter, are for the most part unable to effect control functions in the television set. Obviously, this is a most desirable if not essential characteristic of a remote system.

The present invention permits the system to retain this attractive attribute while at the same time affording a simplification in the receiver chassis. Applicant has discovered a modified form of receiver which may eliminate the detector and integrating system from the arrangement illustrated in the Adler patent.

Additionally, applicants' proposed receiver lends itself especially well to transistorizing since it employs a semiconductor type of switching device to control the relay which is to be actuated in order to accomplish a control function in the associated television set. This provides the possibility of further enhancing the utility and attractiveness of the remote control. When the receiver chassis is transistorized, the power requirements and operating voltages are so reduced that it is entirely feasible to permit the receiver chassis to remain on a standby basis indefinitely. This of course increases the utility of the control arrangement.

It is therefore an object of this invention to provide an improved remote control system.

Another object of this invention is to provide an improved remote control system which may operate directly in response to a super audible command signal without requiring the detector stage characteristic of previous systems.

A further object of this invention is to provide a novel remote control system which permits reduced space requirements for the receiver portion.

It is still a further object of this invention to provide a remote control system of novel construction which lends itself particularly well to transistorizing with the added benefits of reduced power requirement and a more practicable possibility of continuous standby operation without material risk of the dangers of overheating and the like.

Accordingly, the invention is directed to a remote control system for performing a predetermined control function, for example tuning of a television receiver, in response to a received airborne command signal having a frequency above the range of audibility. The system has means including a microphone and an amplifier for developing from the received command signal an alternating electrical control signal of a predetermined minimum duration and of a predetermined frequency related to that of the command signal. Frequency selective means having an input coupled to the signal developing means and an output is provided for translating only signals of a frequency substantially equal to that of the alternating control signal. Apparatus is provided for performing the desired control function and switching means, including a semiconductor switching device having a control electrode directly connected to the output of the frequency selective means, directly responsive to the translated alternating control signal is provided in order to actuate that apparatus as required to perform the desired control function.

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements, and in which:

Figure 1:
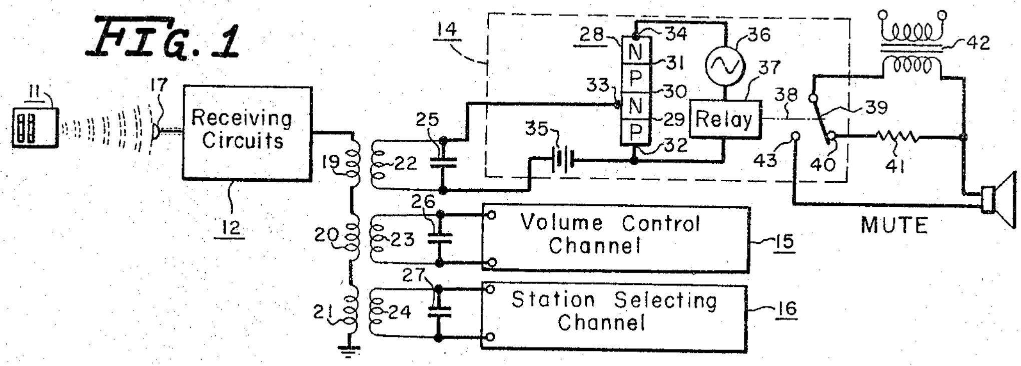
FIGURE 1 is a schematic representation of one form of remote control system constructed in accordance with the invention.

Referring now more particularly to FIGURE 1, the remote control system there represented is for performing a desired number of control functions in a television receiver in response to received airborne command signals having frequencies above the range of audibility. In general, such a system may be adapted to control any operating parameter of the television receiver such as channel selection, on-off, muting, volume control, contrast, brightness control and such like. The specific parameter subject to the operation of the remote control is of no moment to the present invention which, for illustrative purposes, is employed to effect muting, volume control and channel selection as indicated by the legends. In any event, the arrangement under consideration may exercise a variety of controls on the controlled receiver and therefore it is necessary to permit a selection as to the control which a given command signal may exercise. This is usually accomplished on the basis of frequency selection, assigning a command signal of one frequency to muting, and assigning the functions of volume control and channel selection to other command signals having different and individualized frequency values.

For the comfort and convenience of the user in a home installation, it is desirable that the command signals be located in a portion of the frequency spectrum that is above audibility and that specific command frequencies employed be chosen with the view of minimum interference with the significant operating frequencies of the receiver, and it is further desirable for purposes of immunity of the apparatus from actuation by random noise impulses that the command signal be of a predetermined minimum duration. It has been found that frequencies close to 40 kc. and of a usable duration approximating .3 second are suitable for the application of the invention under consideration.

The command signals are developed by a transmitter 11, shown in block form since it constitutes no part of the present invention. A suitable form of transmitter is described in the above-identified Adler patent. It includes one longitudinal-mode vibrator for each of the command signals required. Usually the vibrator is a rod of aluminum having a length selected to establish the desired signal frequency.

The transmitter further includes a hammer or exciter for each such rod and an actuating mechanism to facilitate impacting a desired rod with its hammer to generate a command signal. It is distinctly preferable that the transmitter be entirely mechanical, be of such physical size as to be carried in the hand and be subject to actuation by finger pressure; all of these objectives are realized with the arrangement described in the Adler patent.

Aside from the transmitter, the remote control system has a companion receiver chassis, sometimes referred to as a remote amplifier, located immediately adjacent to and operatively associated with the television receiver that is to be controlled. Such a receiver comprises means including a microphone and an amplifier for developing from each command signal an alternating electrical control signal of a predetermined frequency and minimum duration related to that of the received command signal. This portion of the receiving system is designated by block 12 which, as explained in the Adler patent, includes stages of amplification and amplitude limiting. A microphone 17 provides the input of the receiver, functioning in the usual way to convert a received radiation into an electrical signal of the same frequency as the received energy.

Since the hand transmitter is readily portable, its distance from microphone 17 may vary over a considerable range with the result that the received command signals may have an intensity that likewise may vary over a wide range. Sufficient amplification follows the microphone to drive the amplitude limiter as required to produce at the output of unit 12 control signals of essentially constant amplitude. While an amplitude limiter is eminently suited for this purpose, equivalent results of constant signal intensity may be attained by using a suitable automatic gain control system in the receiver stages represented by block 12.

Since the remote amplifier exhibits a high gain in order to have the desired sensitivity, there is a possibility of feedback which may be minimized by providing a frequency multiplier within unit 12. A frequency multiplier is shown in the Adler patent having a multiplication factor of 3. This aids in stabilizing the amplifier in spite of its high gain and therefore the expression "alternating electrical control signal of a frequency related to that of the command signal," as used in the annexed claims, is intended to include multiplication of the received signal frequency by integers including 1.

Any practical remote control system should be protected against spurious operation due to the presence of noise or other signals that may often be encountered in the location of the remote control receiver. Some measure of protection results in having the remote amplifier as selective, frequency-wise, as practicable in order that its acceptance band may be no wider than required to utilize the command signals that may be directed to it. The function of amplitude limiting also helps in the attainment of noise protection and still further benefits may be attained from a requirement that the command signal satisfy the aforesaid minimum duty cycle before the the amplifier responds. This is fully explained in the Adler patent and is accomplished by including within the amplifier an arrangement establishing an amplitude-time threshold that must be reached before the amplifier responds and exercises its control over the associated television receiver.

A number of ways of accomplishing this result quickly suggest themselves. For example, one may include in the amplifier a rectifier which responds to the received command signal and develops a potential through an integrating process to, in effect, unblock a portion of the remote amplifier only when the integrated energy attains a preselected minimum level. Alternatively, the Q of resonant devices in the remote amplifier may be adjusted through appropriate selection of the circuit parameters to control the rate of signal build-up. If the Q is high, the alternating current electrical signal in the resonant circuit, assuming that the applied signal is limited in amplitude, will require a certain minimum time to develop to a threshold level in the resonant circuit. This may be likened to introducing a time-delay in the system although the operative and significant factor is the duty cycle of the command signal. If the environment of the controlled receiver is quiet in the sense of random noise in the frequency range of the command signal, one may dispense with this noise protection. In any event, arrangements for achieving such protection are known and therefore have not been illustrated in the annexed drawing. The approach of integration is illustrated in the Adler patent and is also described in a copending application of Druz and Isabeau, Serial No. 14,299, filed March 11, 1960, now Patent No. 3,078,444, issued February 19, 1963, and assigned to the assignee of the present application.

The amplitude limited control signal developed in unit 12 is supplied to frequency selective means which translates only signals of a frequency substantially equal to that of the alternating control signal. Specifically, this circuit includes the primary windings of a number of transformer type signal selectors, and three such windings 19, 20 and 21 are indicated in FIGURE 1. The switching arrangements are designated 14, 15 and 16 in FIGURE 1 and, since they are all the same, except as to the frequency to which they respond, detailed consideration will be given only to the one designated 14.

Unit 14 is a switching means, including a semiconductor switch device 28 having a control electrode 33 directly connected to the output of the frequency selective means, and is directly responsive to the translated alternating control signal for actuating the relay or other apparatus relied upon to perform the desired control function. Like any switching device, unit 14 has two operating states, an open or non-conductive condition in which it exhibits a high impedance and a closed or conductive condition in which it represents a low impedance; its actuation between these conditions constitutes a switching function. The device under consideration also has the characteristic that once having been triggered into conduction by a signal at its control electrode it remains so conductive independent of any control signal; the device may only be restored to or maintained in its non-conductive state by lowering its anode-cathode potential below a minimum threshold.

The switching device under consideration is a bistable device comprised of a uni-lateral, four-layer silicon controlled rectifier in which successive layers of semiconductor material are of opposing conductivity as represented by the legend PNPN. Of course, the alternate polarity of NPNP is equally useful in the switching unit. The contiguous layers of alternate conductivity form three junctions 29, 30 and 31 to which the usual electrodes, including a cathode or input electrode 32, a gate or control electrode 33 and an anode 34 or output electrode are affixed.

Means are provided for connecting this switch to a relay 37 to actuate the relay when the switch has been triggered from an open to a closed condition. This means includes a power source 36 and suitable leads defining a series circuit from anode 34 to cathode 32 and including source 36 and relay 37. While a D.C. source may be employed, it is most convenient that potential supply 36 be a source of alternating current having a frequency such that at least several cycles of alternating current occur within any usable command signal, that is, the duration of one-half cycle of source 36 is short relative to the aforementioned predetermined minimum duration of the command signal. In practice, a 60 cycle supply is used and the rectification thereof by conduction of the silicon-controlled rectifier during alternate half-cycles of source 36 in response to a continuing control signal provides an energy level, averaged over the duration of a usable command signal, sufficient to energize relay 37.

Means comprising source 36 normally maintains the switching device in one of its operating states, but periodically conditions the device during successive intervals individually short relative to the predetermined minimum control signal duration to respond to a coincidentally receive control signal for actuating the device to its other operating state. Also a bias potential source 35, coupled between cathode 32 and gate 33 by means of an inductor 22 is of a polarity and amplitude to the end that the switch, in the absence of a received command signal of a frequency to which selector 22, 25 is tuned, is in its normal operating state, i.e., open. The frequency selective means including parallel tuned output circuit 22, 25 and input winding 19 is directly connected via the output circuit to control electrode 33. The switching means is directly responsive to a control signal translated by the frequency selector for actuating the control apparatus. Thus, it is apparent that the need of a signal detector is obviated and the A.C. control signal is applied directly to switching device 14. However, the system exhibits excellent noise immunity despite the elimination of the usual detection and integration circuitry. This may be attributed to the fact that the switching device is by virtue of the alternating potential at its anode and cathode electrodes only capable of actuation during alternate half-cycles, the device being completely immune to actuation during intervening half-cycles. Further, the energy provided by the alternating power source and the inertia of the associated control device, shown in FIGURE 1, as relay 37, are so apportioned that the control apparatus is only responsive to repeated actuation of the switching device to its conductive state during successive alternate half-cycles of the potential source.

The broken-line connection 38 extending from relay 37 to switch 39 indicates that the movable element of the switch is physically displaced to engage stationary contact 40 and 43 as relay 37 is actuated by conduction in the semiconductor switch. The relay is bi-stable and upon one actuation closes against switch contact 40 where it remains until its next actuation at which time it closes against contact 43. When against the latter contact, the relay keeps the speaker of the television receiver operatively connected to its drive but when engaging contact 40, the relay in effect places a shunt across the speaker coil to mute the receiver.

In considering the operation of the described system, it will be understood that bias source 35 establishes a reverse bias on the semiconductor switch, biasing it to its non-conductive or high impedance condition. This condition prevails until the reception of a command signal having a frequency to which the muting function has been assigned.

Upon the receipt of such a signal, it is converted into a corresponding electrical signal in unit 12 where it is amplified and limited and then translated through winding 19 and selector 22, 25. Negative half cycles of this electrical signal serve as a forward bias across junction 29 tending to overcome the effect of bias source 35 and render rectifier 28 conductive. At the same time, source 36 applies a potential to the anode and cathode of the rectifier which on positive half-cycles aids source 35 in maintaining the rectifier nonconductive. During negative polarity excursions of the signal from source 36, however, the potential across the anode and cathode are in a direction which tend to result in conduction. The concurrent effect of the forward bias across junction 29 during a negative half cycle of a control signal and a negative half cycle of the signal from source 36 triggers the switch from its open to its closed condition. Within the duration of any usable command signal, there will be sufficient coincidence of the appropriate polarities of the command signal applied to gate electrode 33 and the A.C. signal applied across the anode and cathode 32, 34 to result in establishing an average energy level in the load circuit of switching device 28 to actuate relay 37. The relay actuates and shifts from its position against one of contacts 40 and 43 to the other. When the switch engages contact 40 it mutes the sound of the controlled receiver and when it engages contact 43 it removes the mute.

After the termination of the command signal, bias source 35 re-establishes a reverse bias between electrodes 32 and 33 which tends to cause the switch to resume its open or high impedance condition and it assumes that condition as soon as source 36 causes anode electrode 34 to be positive with respect to cathode electrode 32. The next command signal having a frequency assigned to muting reactivates switch 14 and shifts movable switch contact 39 to the other of its stationary contacts 40, 42.

The remaining switch units 15 and 16 function in substantially the same way but require command signals of specifically different frequencies to actuate them. The frequency selection is imposed by their selectors 23, 26 and 24, 27. Control apparatus operated by each such control unit has not been shown in detail because its specific construction is of no particular concern. One may be a relay structure that operates a volume control potentiometer in the receiver and the other may be an energizing circuit for a tuning motor which, when energized, drives a channel selector from one operative position to the next to tune the receiver.

Figure 2:
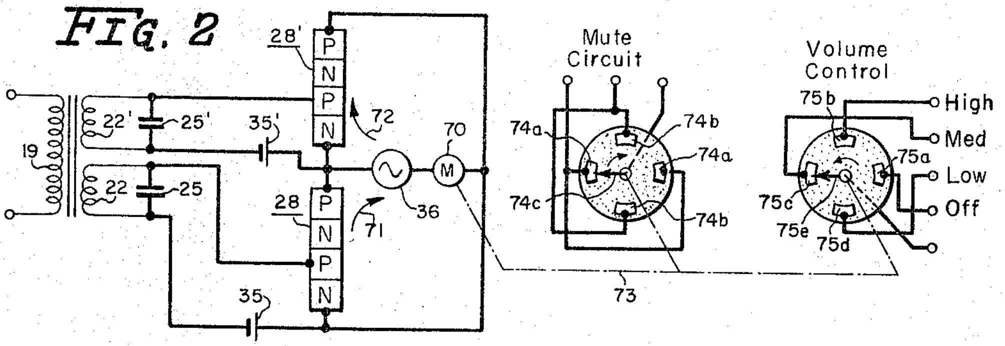
FIGURE 2 is a modification in which a pair of semiconductor switching devices control a single, bidirectional controlled element, namely, a motor.

In the modification of FIGURE 2, a pair of semiconductor switching devices, which are individually the same in construction and operation as device 28 in FIGURE 1, collectively control bidirectional control apparatus, as a bidirectional motor, for selectively performing either of two control functions as determined by the direction of rotation of the motor. More particularly, the arrangement includes two semiconductor devices 28 and 28' and frequency discriminating means comprising tuned selectors 22, 25 and 22', 25' for segregating the control signals and for applying only signals of a frequency substantially equal to that of a respective one of the control signals to the respective control electrodes. The circuits also include the biasing sources 35 and 35' so connected that each applies a reverse bias between the cathode and control electrodes of its associated semiconductor device.

A first unidirectional signal path may be established with the A.C. potential source 36 and a bidirectional device 70 through semiconductor rectifier 28 when the switch represented by that conductor is closed or conductive. Since this is a rectifying device, however, it can only be closed during positive half-cycles of the potential from source 36; positive in the sense that the terminal of source 36 connected to the motor is negative with respect to the terminal connected to the device 28. A similar unidirectional path may be established to motor 70 from source 36 through rectifier 28' during intervals in which the switch which it represents is closed. Again, since this is a rectifying device, it can operate only during negative half cycles of the potential from source 36. In other words, means utilizing the A.C. source normally maintains the switching devices in their non-conductive states, but periodically conditions the devices during successive alternate intervals to respond to a coincidentally received control signal for actuating the conditioned device to its conductive state. Also, as previously discussed, the aforesaid alternate intervals are preferably individually short relative to the predetermined minimum duration of the control signal.

Of course, bidirectional motor 70 is coupled to the switching devices and is responsive only to repeated actuation of a predetermined one of the devices to its conductive state during successive half-cycle intervals of source 36 for actuating the motor in one direction and is responsive only to repeated actuation of the other of the devices to its conductive state during successive opposite half-cycle intervals for actuating the apparatus in the other direction.

Since motor 70 is bidirectional, it is a simple matter to have it accomplish either of two control functions in accordance with its direction of rotation through the mere expedient of coupling control elements with the motor shaft through opposed unidirectional or one-way coupling clutches. The shaft of motor 70 is indicated schematically by broken-construction line 73 and the controlled devices are designated 74 and 75.

Unit 74 controls muting of the television receiver and has one series of contacts **74*a* interspersed with a like series of contacts 74*b*. A movable element 74*c* of the switch shall be considered as coupled to shaft 73** through a clutch which responds only during rotational displacement of the motor shaft in a particular direction. For simplicity, this coupling mechanism has not been shown in the drawing.

Unit 75 is the volume control and on/off arrangement for the television receiver. It has four contact segments **75*a–d*. Its rotary element 75*e* is also coupled to motor shaft 73 through a one-way clutch arranged to effect displacement of switch element 75*e* only during intervals in which the motor rotates in a direction opposite to that to which unit 74 responds and again, for convenience, this clutch has been omitted from the drawing. As the rotating element engages stationary contacts 75*a–d*** in succession, the operating condition of the television receiver will be assumed to change from a condition of high volume, to medium volume, to low volume and finally to off, respectively.

Electrical command signals of a frequency to which muting has been assigned actuate rectifier 28 and step unit 74 from one to the next of its stationary contacts in precisely the same fashion as described in conjunction with FIGURE 1. On the other hand, a command signal of the frequency assigned to volume-on/off, closes the switch including rectifier 28' and advances the movable element **75*e* to its next succeeding contact. To occasion this displacement of switch element 75*e*, however, motor 70 operates in a direction opposite to that in which it functions when switch 28 is closed. The bidirectional rotation of the motor comes about in the usual way, namely, in response to energizing currents of opposite phase as represented by arrows 71 and 72 which show the direction energizing current flows in the circuits of switches 28 and 28'** respectively.

Figures 3, 4:
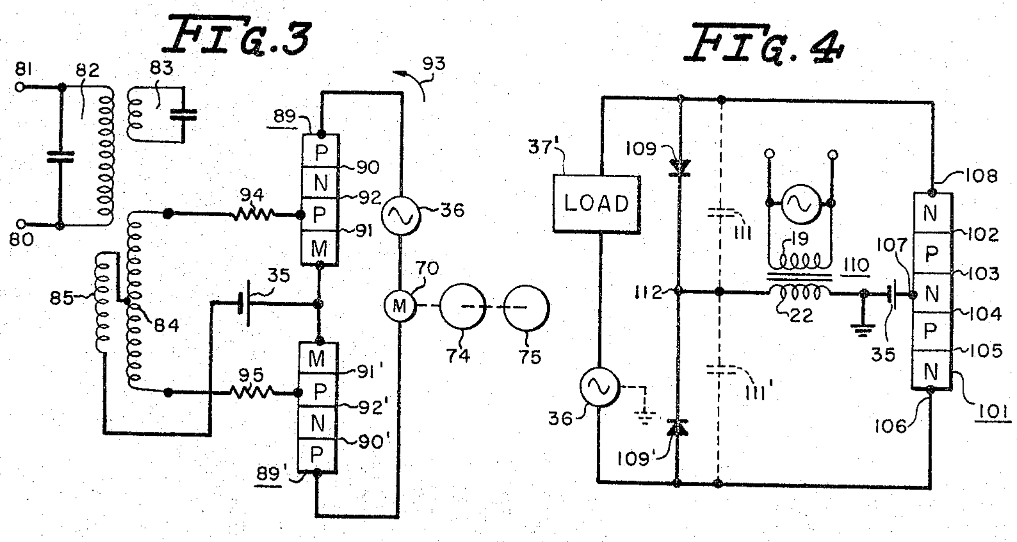
FIGURE 3 represents an arrangement similar to that of FIGURE 2 with a different switch device and a different coupling network between the switches and the preceding stages of the amplifier.
FIGURE 4 shows still another form of switching device controlling a bidirectional element or load.

The embodiment of FIGURE 3 differs from the preceding arrangements principally in the nature of the switching devices 89 and 89'. Again, the devices are similar, four-layer semiconductors having a metallic zone M followed in succession by zones of p, n, and p conductivity, but differ from the previously discussed devices in that each exhibits a predetermined low voltage reverse breakdown characteristic in which the device represents a low impedance. These zones form three junctions 90, 91 and 92. Junction 90 is so constructed that it breaks down in the presence of a predetermined low reverse voltage, perhaps of the order of 2–3 volts. Junction 91 is similar in that regard but breaks down in the face of an even lower reverse potential of the order of 0.1–0.2 volt. The third junction 92 is a conventional p–n junction.

The switches are connected in what may be referred to as back-to-back relation with the M zones conductively connected and their outer p zones connected through a series circuit comprising the excitation source 36 and bidirectional motor 70.

The input circuits of the switch devices are each comprised of a conventional frequency discriminating circuit which includes a pair of tuned circuits 82, 83 tuned to a common frequency. More particularly, they are resonant to a frequency which is located midway of the frequencies of the two command signals to which the arrangement under consideration is to respond. Input terminals 80, 81 permit the connection of this arrangement to driving circuits, such as circuitry 12 of FIGURE 1, which apply an electrical control signal of a limited and constant amplitude when the arrangement is to accomplish a control function.

The discriminator is completed by a winding 85 conductively coupled to tuned circuit 82 and a second winding 84 inductively coupled to tuned circuit 83. Opposed ends of winding 84 connect to the inner p zones of devices 89, 89' through resistors 94, 95. One terminal of winding 85 connects to a center tap of winding 94 and its other terminal is coupled through a bias battery 35 to the M zones of the switches.

In considering the operation of the arrangement of FIGURE 3, it will be understood that the driving signal is of known and constant amplitude as mentioned above. It will further be assumed that battery 35 applies a reverse bias to junctions 91, 91' which, in the absence of a received command signal, precludes the series circuit of switches 89 and 89' from exhibiting a low impedance. Finally, it will be understood that the peak value of the A.C. signal delivered by source 36 is far in excess of the value of reverse breakdown voltage of junctions 90, 90'. With respect to frequency considerations and duration of the control or command signals, the operating requirements are essentially the same as those discussed in connection with the embodiment of FIGURE 1.

A quiescent condition occurs in the absence of a received command signal. During the half-cycle of the A.C. signal from source 36 in which the actuator p zone of switch 89 is positive relative to the corresponding zone of swtich 89', the impedance conditions of two switches are as follows: junction 90 is forwardly biased; junction 92 is reverse biased and represents a high impedance while junction 91 is forwardly biased if the influence of potential source 36 alone is considered. The presence of battery 35, however, results in the reverse bias condition of junction 91. This condition prevails throughout the positive half-cycle of the signal from source 36.

Throughout that same time interval, the bias and impedance conditions of the alternate switch 89' are these: junction 90' is reverse biased but early in the cycle the value of that bias exceeds breakdown and this junction represents a low impedance. Junction 92' is forwardly biased and junction 91' is reverse biased but it also breaks down under the influence of the signal from source 36. As a consequence, device 89' is a low impedance but the series circuit through the switching devices is effectively open because of the high impedance presented at junction 92 of device 89. Resistor 95 prevents junction 91' from short-circuiting bias source 35.

During opposite half-cycles of the signal of source 36, a generally similar condition of biases and impedances is established but now switch 89 is a low impedance while switch 89' is a high impedance. Again resistor 94 prevents loss of bias on junction 91. The circuit through motor 70 remains interrupted.

In order to complete an energizing circuit for motor 70 it is necessary to selectively actuate a trigger circuit of one of the devices 89 and 89' to establish a condition in which both switches represent a low impedance. From the aforedescribed quiescent conditions, it is apparent that during one polarity condition of the switches device 89 may respond to a trigger or control signal and become a low impedance whereas device 89' responds to a trigger signal only during alternate polarity intervals of the signal from source 36. For this reason, the direction of signal flow through motor 70 is dependent upon which of devices 89, 89' responds to a received trigger signal.

For either such device to respond to a trigger or command signal, the voltage applied from the discriminator network must in effect overcome the reverse bias applied by battery 35 across junction 91 or 91' and the discriminator, being a frequency selective network with two peak responses, premits device 89 to respond to a command signal of one frequency which may be above the frequency to which circuits 82, 83 are tuned while device 89' responds to a command signal spaced the same amount but below the resonant frequency of circuits 82, 83.

In particular, let it be assumed that a command signal is received of such frequency that the voltage applied across junction 91 of device 89 exceeds the effective bias otherwise experienced by this junction during quiescent conditions. For the assumed condition, early in each positive half-cycle of the signal from source 36, device 89 is conditioned to respond to the received command signal. During positive half-cycles of the command signals which occur during the positive half-cycles of the excitation signal from source 36, the effect of bias battery 35 is overcome, junction 92 becomes saturated and device 89 is converted from a high to a low impedance and a high reverse voltage is thus applied to device 89' to cause its breakdown as required to permit current to flow through motor 70 in the direction of arrow 93. This condition is maintained until the next succeeding negative polarity portion of the excitation potential from source 36.

The current flow through motor 70 actuates the one of control devices 74, 75 which is sensitive to the particular direction of motor rotation as described in conjunction with the arrangement of FIGURE 2.

In similar fashion, motor 70 may be energized to rotate in the opposite direction and actuate the other of units 74, 75 in response to a command signal of a frequency which triggers device 89' and applies the high voltage of source 36 to the terminals of device 89 to result in its reverse breakdown.

Where the remotely controlled circuit includes a bidirectional motor, it is usually adequate to have the response to the command signal restricted to the requirement for closing a holding circuit for the motor. This has the advantage of freeing the actuation of the controlled device from the duration of the command signal so long as the command exceeds the minimum duration and duty cycle requirements of the system. The holding circuit when once completed steps the motor in a step by step fashion from one adjustment of the controlled device to the next. It is also well understood in the art that the energizing circuit is disabled after the controlled unit has been stepped one position and, if desired, a delay may be introduced before the energizing circuit of the motor is permitted to respond to another command signal to protect against a circumstance of a command signal of unusually long duration which otherwise could cause multiple responses of the controlled device.

The modification of FIGURE 4 employs a symmetrical semiconductor switch 101 having five layers forming four junctions and also having three terminals. A device of this type is described and claimed in application Serial No. 837,008 filed in the name of George Wertwijn on August 31, 1959, now abandoned. The inner pair of junctions 103 and 104 are formed by diffusion and exhibit good reverse voltage breakdown characteristics whereas the outer pair 102 and 105 are alloyed junctions having a very low reverse voltage breakdown. The terminals are designated 106, 107 and 108 and are connected to the end and middle zones as indicated.

A pair of diodes 109 and 109' are connected in series opposition across end terminals 106, 108 of the switch and collectively constitute a polarity sensitive bidirectional signal path. Since the switch is an NPNPN structure the positive terminal of bias source 35 connects to terminal 107 and the opposite terminal of the source connects through the secondary winding 22 of a coupling transformer 110 to the junction 112 of the diodes.

The primary winding 19 of the transformer may be coupled to the receiving circuits 12 of the amplifier, as in the arrangement of FIGURE 1, in order to apply control signals directly, that is to say without rectification, to the symmetrical switch of FIGURE 4. The load or controlled device 37 is connected in series with A.C. source 36 across the diodes and across the end zones of the switch.

In considering the operation of this modification attention will be directed initially to the quiescent condition wherein no control signals are instantaneously applied to the switch. If it be assumed that source 36 causes terminal 108 to be positive relative to terminal 106, diode 109 conducts and diode 109' is non-conductive. As a consequence, the junction 112 of the diodes approaches the potential of switch terminal 108, differing therefrom by the small potential drop of diode 109. The voltage conditions thus established at the several terminals of the switch are unable to cause conduction therethrough and the switch is a high impedance or may be said to be open.

More particularly, junction 104 is reversed-biased and junction 105 is forwardly biased. Since junction 104 has a good reverse voltage breakdown characteristic, it maintains a high impedance between terminals 107 and 106 through the switch. The potential across junction 102 is merely the small voltage drop of diode 109 which is insufficient to cause breakdown and therefore the switch also represents a high impedance between its terminals 107 and 108. Thus both sections of the switch, considering the device as having two halves that are symmetrical with respect to the center zone, represent a high impedance and the switch is open. This same condition prevails if the opposite polarity of the signal from source 36 is considered during the absence of a control signal applied to transformer 110. The only difference for the alternate polarity condition is that diode 109' is conductive and diode 109 is non-conductive but the end effect on the switch, from the standpoint of its impedance, remains unchanged.

In explaining the change in switch impedance in the presence of a control signal applied to transformer 110, it is convenient once more to refer to the operating instant in which source 36 causes switch terminal 108 to be positive relative to terminal 106. The control signal induces a signal potential in winding 22 in series with bias 35. Consider that the instantaneous polarity of the control signal is opposed to that of bias source 35. The path for the control signal, which is of a much higher frequency than source 36, is afforded by capacitances 111 and 111', shown in broken-line construction since they may be comprised in whole or in part by the distributed capacitances of the diodes. The signal potential thus added to terminal 108 exceeds the breakdown level of junction 102, resulting in breakdown at this junction and current multiplication across junctions 102 and 103. This causes saturation of carriers in the central zone of the switch which effects saturation at junction 104 and, since junction 105 is forwardly biased, the impedance across terminals 106 and 108 is changed from its high or open circuit value to a low or closed circuit value.

Current now flows through the load or controlled device 37′ through two parallel paths, one extending directly between terminals 106 and 108 of the switch and the other through diode 109 and terminals 106, 107 of the switch. This low impedance condition will prevail throughout the particular half-cycle of the signal from source 36 which has caused switch terminal 108 to be positive relative to terminal 106.

The alternate half-cycle of the signal from source 36 produces a similar impedance condition and continues current flow through load 37′ but of opposite phase. In this case, one branch of the signal path is between terminals 106, 108 of the switch and the other branch is through diode 109′ and terminals 107, 108 of the switch. At the termination of the control signal, the first-described circuit conditions are established which restore the switch to open circuit.

In all of the arrangements described above, there is direct utilization of the control signal by the switching device which avoids the necessity for a detector preceding the switching device. This simplifies the structure which has been found to provide satisfactory operation of the control system.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A remote control system for performing a predetermined control function in response to a received airborne command signal having a frequency above the range of audibility comprising:

means including a microphone and an amplifier for developing from said command signal an electrical control signal of a predetermined minimum duration and of a predetermined frequency related to that of said command signal;

a semiconductor switching device including input, output and control electrodes and having two operating states;

frequency selective means coupled between said signal developing means and said control electrode for applying to said control electrode only signals of a frequency substantially equal to that of said control signal;

means normally maintaining said switching device in one of said operating states, but periodically conditioning said device during successive intervals individually short relative to said predetermined duration to respond to a coincidentally received control signal for actuating said device to its other operating state;

and control apparatus coupled to said switching device and responsive only to repeated actuation of said device to said other state during said successive intervals for performing a predetermined control function.

2. A remote control system adapted for energization from an alternating current power source for performing a predetermined control function in response to a received airborne command signal having a frequency above the range of audibility comprising:

means including a microphone and an amplifier for developing from said command signal an electrical control signal of a predetermined minimum duration and of a predetermined frequency related to that of said command signal;

a semiconductor switching device including input, output and control electrodes, and having two operating states;

frequency selective means coupled between said signal developing means and said control electrode for applying to said control electrode only signals of a frequency substantially equal to that of said control signal;

means coupled betwen said input and output electrodes of said switching device and including means for utilizing said alternating current source for normally maintaining said switching device in one of said operating states, but periodically conditioning said device during successive intervals individually short relative to said predetermined duration to respond to a coincidentally received control signal to actuate said device to its other operating state;

and control apparatus coupled to said switching device and responsive only to repeated actuation of said device to said other state during said successive intervals for performing a predetermined control function.

3. A remote control system adapted for energization from an alternating current power source for performing a predetermined control function in response to a received airborne command signal having a frequency above the range of audibility comprising:

means including a microphone and an amplifier for developing from said command signal an electrical control signal of a predetermined minimum duration and of a predetermined frequency related to that of said command signal;

a semiconductor switching device including input, output and control electrodes having conductive and non-conductive operating states;

frequency selective means coupled between said signal developing means and said control electrode for applying to said control electrode only signals of a frequency substantially equal to that of said control signal;

means coupled between said input and output electrodes of said switching device and including means for utilizing said alternating current source for normally maintaining said switching device in said non-conductive state, but periodically conditioning said device during successive intervals individually short relative to said predetermined duration to respond to a coincidentally received control signal to actuate said device to its conductive state;

and control apparatus coupled to said switching device and responsive only to repeated actuation of said device to said conductive state during said successive intervals for performing a predetermined control function.

4. A remote control system adapted for energization from an alternating current power source for performing either of a pair of control functions in response to a respective one of a pair of received airborne command signals having different frequencies above the range of audibility comprising:

means including a microphone and an amplifier for developing from said command signals alternating electrical control signals of a predetermined minimum duration and of different predetermined frequencies related to those of said command signals;

a pair of semiconductor switching devices each including input, output and control electrodes and each having conductive and non-conductive operating states;

frequency discriminating means coupled to said signal developing means and to said switching devices for segregating said control signals and for applying only signals of a frequency substantially equal to that of a respective one of said control signals to said respective control electrodes;

means utilizing said alternating current source for normally maintaining said switching devices in their non-conductive states, but periodically conditioning said devices during successive alternate intervals individually short relative to said predetermined duration to respond to a coincidentally received control signal for actuating said conditioned device to its conductive state;

and bidirectional control apparatus coupled to said switching devices and responsive only to repeated actuation of a predetermined one of said device to its conductive state during said successive intervals for actuating said apparatus in one direction and responsive only to repeated actuation of the other of said devices to its conductive state during successive intervals for actuating said apparatus in the other direction.

5. A remote control system adapted for energization from an alternating current power source for performing a predetermined control function in response to a received airborne command signal having a frequency above the range of audibility comprising:

means including a microphone and an amplifier for developing from said command signal an electrical control signal of a predetermined minimum duration and of a predetermined frequency related to that of said command signal;

a symmetrical semiconductor switching device including a pair of output electrodes and a control electrode, and having conductive and non-conductive operating states;

frequency selective means coupled to said signal developing means for translating only signals of a frequency substantially equal to that of said control signal;

control apparatus adapted for operation from an alternating current source;

means coupled between said output electrodes and including means for connecting said alternating current source in series with said control apparatus for applying an alternating voltage to said control electrodes;

a pair of rectifiers each coupled between a respective one of said output electrodes and said control electrode in phase opposition for alternately providing a low impedance path and a high impedance path between said output electrodes and said control electrode in accordance with the polarity of said alternating voltage;

and means including said frequency selective means for applying said control signal to said control electrode to actuate said device to its conductive state and operate said control apparatus.

6. A remote control system adapted for energization from an alternating current power source for performing either of a pair of control functions in response to a respective one of a pair of received airborne command signals having different frequencies above the range of audibility comprising:

means including a microphone and an amplifier for developing from said command signals alternating electrical control signals each of a predetermined minimum duration and of diffierent predetermined frequencies related to those of said command signals;

a pair of semiconductor switching devices each having input, output and control electrodes, a predetermined low voltage reverse breakdown characteristic in which said device represents a low impedance and each further having conductive and nonconductive operating states;

frequency discriminating means coupled to said signal developing means and said switching devices for selectively applying said control signals to said control electrodes;

means coupled in series with said devices and including means for utilizing said alternating current source for normally maintaining said switching devices in their non-conductive states, but periodically conditioning said devices during successive alternate intervals individually short relative to said predetermined duration to respond to a coincidentally received control signal for actuating said conditioned device to its conductive state and for applying a reverse breakdown voltage to said other device;

and a bidirectional control apparatus coupled in series with said switching devices and said alternating current source and responsive only to repeated actuation of a predetermined one of said devices to its conductive state and subsequent reverse breakdown of said other device during said successive intervals for actuating said apparatus in one direction and responsive only to repeated actuation of the other of said devices to its conductive state and subsequent reverse breakdown of said one device during successive intervals for actuating said apparatus in the other direction.

7. A remote control system for performing a predetermined control function in response to a received airborne command signal having a frequency above the range of audibility comprising:

means including a microphone and an amplifier for developing from said command signal an alternating electrical control signal of a predetermined minimum duration and of a predetermined frequency related to that of said command signal;

frequency selective means having an input coupled to said signal developing means and an output for translating only signals of a frequency substantially equal to that of said alternating control signal;

apparatus for performing said predetermined control function;

switching means having an operative and an inoperative state and indicating a semiconductor switching device having a control electrode directly connected to said output of said frequency selective means, said switching means being directly responsive to said translated alternating control signal only when said switching means is in its operative state for actuating said apparatus;

and means for alternating said switching means between said operative and said inoperative states.

8. A remote control system for performing a predetermined control function in response to a received airborne command signal having a frequency above the range of audibility comprising:

means including a microphone and an amplifier for developing from said command signal an alternating electrical control signal of a predetermined minimum duration and of a predetermined frequency related to that of said command signal;

frequency selective means having an input coupled to said signal developing means and an output for translating only signals of a frequency substantially equal to that of said alternating control signal;

apparatus for performing said predetermined control function;

a semiconductor switching device having an operative and an inoperative state and further having a control electrode directly connected to said output of said frequency selective means and directly responsive to said translated alternating control signal only when said device is in its operative state for actuating said apparatus;

and means for alternating said switching device between said operative and inoperative states.

No references cited.

NEIL C. READ, *Primary Examiner.*

P. XIARHOS, A. H. WARING, *Assistant Examiners.*